United States Patent
Kivity et al.

(10) Patent No.: US 8,850,443 B2
(45) Date of Patent: Sep. 30, 2014

(54) ASYNCHRONOUS INPUT/OUTPUT (I/O) USING ALTERNATE STACK SWITCHING IN KERNEL SPACE

(75) Inventors: Avi Kivity, Tel Aviv (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 330 days.

(21) Appl. No.: 13/302,326

(22) Filed: Nov. 22, 2011

(65) Prior Publication Data

US 2013/0132968 A1 May 23, 2013

(51) Int. Cl.
G06F 9/46 (2006.01)

(52) U.S. Cl.
CPC .................................... *G06F 9/812* (2013.01)
USPC ............................ 718/104; 718/107; 718/108

(58) Field of Classification Search
USPC ........................................ 718/104, 107, 108
See application file for complete search history.

(56) References Cited

U.S. PATENT DOCUMENTS

| | | | |
|---|---|---|---|
| 6,366,932 B1* | 4/2002 | Christenson | 1/1 |
| 6,968,557 B1* | 11/2005 | Zhang et al. | 719/319 |
| 2004/0034854 A1* | 2/2004 | Cottrell | 718/100 |
| 2004/0064816 A1* | 4/2004 | Alverson et al. | 718/102 |
| 2008/0313652 A1* | 12/2008 | Klein et al. | 719/318 |

* cited by examiner

*Primary Examiner* — Diem Cao
(74) *Attorney, Agent, or Firm* — Lowenstein Sandler LLP

(57) ABSTRACT

A mechanism for asynchronous input/output (I/O) using second stack switching in kernel space is disclosed. A method of the invention includes receiving, by a kernel executing in a computing device, an input/output (I/O) request from an application thread executing using a first stack, allocating a second stack in kernel space of the computing device, switching execution of the thread to the second stack, and processing the I/O request synchronously using the second stack.

20 Claims, 5 Drawing Sheets

ASYNCHRONOUS INPUT/OUTPUT (I/O) USING ALTERNATE STACK SWITCHING IN KERNEL SPACE

TECHNICAL FIELD

The embodiments of the invention relate generally to an operating system kernel and, more specifically, relate to asynchronous I/O using alternate stack switching in kernel space.

BACKGROUND

Modern operating system kernels provide a mechanism called "asynchronous input/output (I/O)" where an execution thread submits an I/O request and then continues its execution while the I/O is performed in the background. Eventually the submitting thread (or perhaps another thread) checks or waits for the I/O to complete, and continues processing with the result of the operation. This mechanism avoids the inherent delays accompanying I/O requests that are serviced by long-latency devices, such as rotating disks and block storage devices. Typically such devices are mechanical in nature and must physically move to seek a track to read or write, which is orders of magnitude slower than the switching of electric current done by a processor in instruction-processing cycles.

If the storage system is simple (e.g., a block storage device) asynchronous I/O is simple to implement. However, if the storage system is complex (e.g., a file system), where a single I/O request from a thread translates to multiple interdependent requests to the device, implementation of asynchronous I/O becomes more difficult.

Currently, there are multiple ways to implement asynchronous I/O. One technique involves a state machine, where the kernel constructs a structure to track the state of the request, and submits the first of a series of I/O requests to the device. Each time a request completes, the kernel updates the structure and submits the next request. Eventually processing completes and the kernel signals the completion to the requesting thread. The drawback of this approach is that it is complicated to implement and hard to maintain.

Another technique involves passing the request to another thread, known as a helper thread. The requesting thread can then continue processing, while the helper thread processes the I/O request synchronously in the background. When the helper thread completes, it signals the requesting thread so that the requesting thread can then complete the I/O. While simple to implement, this approach incurs additional context switches, even in the case where the I/O could, in fact, be submitted immediately due to the needed data already being cached. These drawbacks reduce, and perhaps even nullify, the performance advantage gained by implementing asynchronous I/O in the first place.

Yet another technique involves running the process, submitting the first interdependent I/O in the series, and returning without waiting for the request to complete. When the I/O completes, the request is restarted from the beginning, so that the contents of the first I/O request are in the cache. Then, the thread proceeds to the second interdependent I/O in the series, submits the request, returns, and restarts from beginning when I/O completes, and so on. This approach avoids context switches, but is complex and requires extra work when restarting the process.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1A:
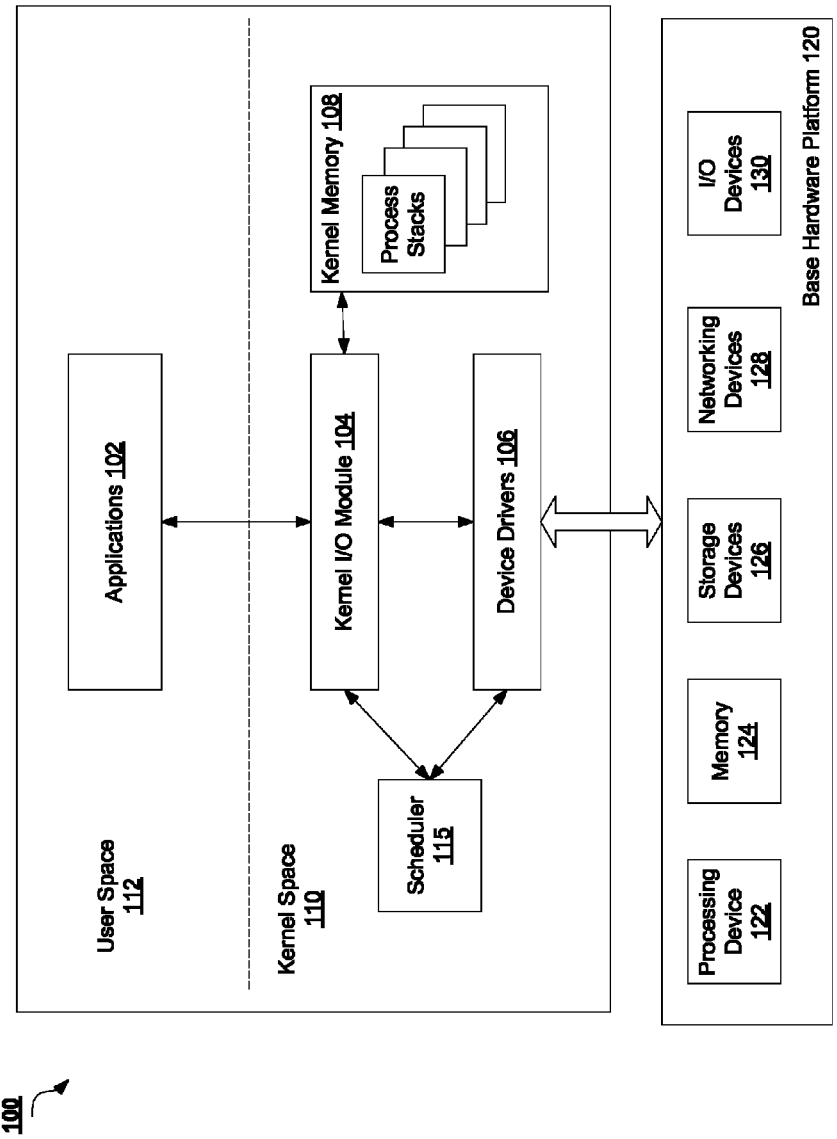
FIG. 1A is a block diagram of a system providing optimized asynchronous I/O according to an embodiment of the invention.

Embodiments of the invention provide for a mechanism for asynchronous input/output (I/O) using alternate stack switching in kernel space A method of embodiments of the invention includes receiving, by a kernel executing in a computing device, an input/output (I/O) request from an application thread executing using a first stack, allocating a second stack in kernel space of the computing device, switching execution of the thread to the second stack, and processing the I/O request synchronously using the second stack.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "allocating", "switching", "processing", "signaling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for asynchronous I/O using alternate stack switching in kernel space. More specifically, embodiments of the invention introduce an alternate stack, in addition to a main stack, in the kernel for a single thread in order to optimize asynchronous I/O. When a thread issues any I/O requests, an alternate stack is allocated and begins processing the I/O request synchronously. If the kernel blocks while running in alternate stack, then it switches back to the main stack instead of blocking the entire thread. When the alternate stack is woken, the kernel is modified to interrupt the thread to switch to the alternate stack, which has higher priority than the main stack. If the ordinary thread execution terminates while an alternate stack exists, the kernel keeps the thread invisibly active until the alternate stack execution completes. One or more of the final I/Os in the thread sequence may utilize a state machine approach for asynchronous I/O processing of these final I/Os.

FIG. 1A is a block diagram of system 100 providing optimized asynchronous I/O according to an embodiment of the invention. System 100 may be part of a computing system such as a client computer (e.g., a personal computer, a laptop, a PDA, a mobile phone, etc.), a server computer, a gateway computer, etc. System 100 includes a vase hardware platform 120 that includes one or more processing devices 122, memory 124, one or more storage devices 126, one or more networking devices 128, and one or more I/O devices 130. Other computing-related devices not listed may also be part of the base hardware platforms 120.

A physical memory (e.g., memory 124) of the system 100 is mapped to virtual memory that is divided into user space 112 and kernel space 110. The kernel space 110 is reserved for running an operating system (e.g., Linux® OS, Windows® OS, etc.). The user space 112 is reserved for user mode applications including applications 102. An application 102 can be any type of application including, for example, a browser application, web application, a desktop application, etc.

In one embodiment, kernel space 110 includes a kernel I/O module 104 to provide asynchronous I/O processing for I/O requests submitted from applications 102 to the kernel space 110. Such I/O requests may be to access data stored in one or more of memory 124 and storage devices 126 of the base hardware platform. Kernel I/O module 104 interacts with device driver 106 in order to obtain the data from any of the various devices 122-130 implemented on base hardware platform 120.

An application 102 in user space 112 may be running a single thread of execution. This thread has a reserved region of memory referred to as its main stack. When a function executes in the thread, it may add some of its state data to the top of the stack; when the function exits it is responsible for removing that data from the stack. At a minimum, a thread's stack is used to store the location of function calls in order to allow return statements to return to the correct location, but programmers may further choose to explicitly use the stack. If a region of memory lies on the thread's stack, that memory is said to have been allocated on the stack. When the thread encounters an I/O request, the main stack will submit this I/O request to the kernel space 110.

Figure 1B:
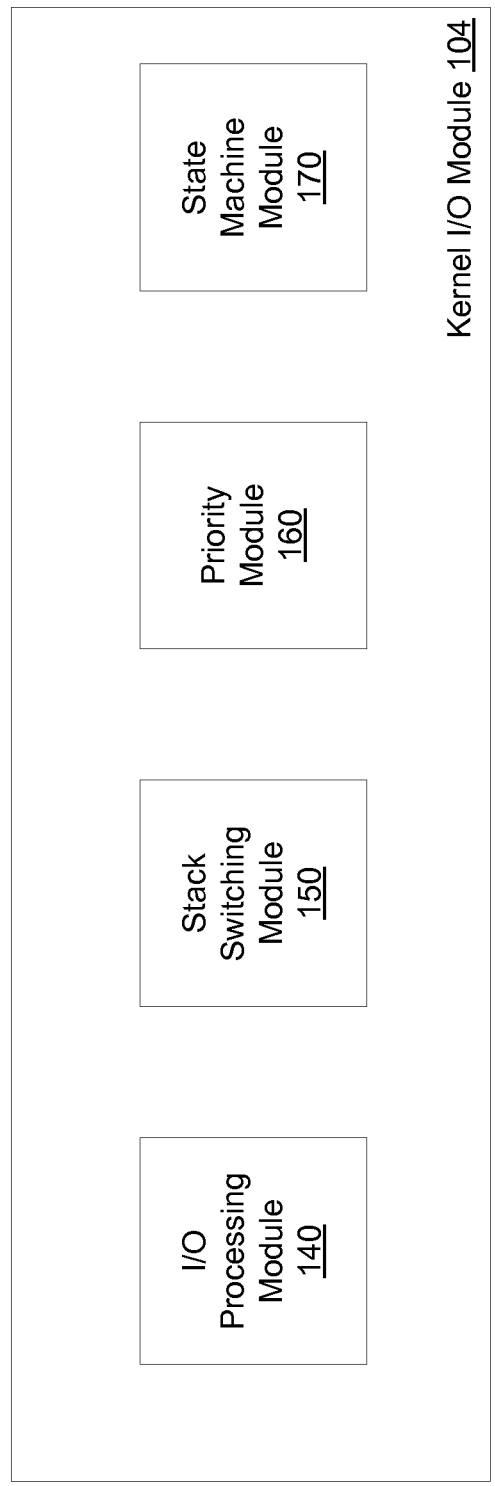
FIG. 1B is a block diagram of components of a kernel I/O module implementing optimized asynchronous I/O with alternate stack processing according to an embodiment of the invention.

In embodiments of the invention, kernel I/O module 104 performs an optimized asynchronous I/O process on this I/O request by utilizing an alternate stack from kernel memory 108, in addition to the main stack. Kernel I/O module 104 is shown in further detail in FIG. 1B, which is a block diagram detailing components of the kernel I/O module 104 that implement the optimized asynchronous I/O with alternate stack processing according to embodiments of the invention.

When an I/O request is received by the kernel I/O module 104, the I/O processing module 140 immediately allocates an alternate stack from the kernel memory 108 for the thread. As a result, the thread has two active processing stacks associated with it, the main stack and the alternate stack. In one embodiment, the alternate stack may be pre-allocated from a prepared pool of kernel memory 108.

Then, the stack switching module 150 causes the thread execution to be switched from the main stack to the alternate stack for processing of the I/O request. In some embodiments, the stack switching module 150 works in conjunction with the scheduler 115 in order to cause the stack switch to occur. The scheduler 115 may be a component in the kernel space 110 that carries out the assignment of processing and requests to processing devices 122 and other devices 124-130.

The switch from the main stack to the alternate stack is a relatively-inexpensive operation as the stack is switched but the kernel is still running in the same context. This is not a full context switch because the kernel is still running on the same thread and a scheduler of the system 100 is not involved in this operation.

Then, the I/O processing module 140 begins processing the I/O request in the alternate stack synchronously, where any accesses to data are started and waited on to complete before moving onto the next access. If the I/O processing module 140 blocks while it is processing the I/O request (e.g., to access data in a block storage device 126). The execution state of the I/O request at this point will be implicitly recorded by the alternate stack. Then, stack switching module 150 switches processing back to the main stack for the thread in order to continue executing in the user space 112. This stack switch avoids blocking the entire thread from executing.

When the data that the alternate stack blocked for returns, the I/O processing module 140 causes the thread to be either interrupted (if it was running) or woken (if it was blocked). Then, the stack switching module 140 switches processing of the thread back to the alternate stack to continue processing at the location the execution was previously halted. The inherent structure of a stack allows the I/O processing module 140 to pick up execution with the alternate stack where it was last halted. The priority module 160 gives the alternate stack higher priority than the thread's ordinary execution at the main stack, allowing the I/O processing module 140 to interrupt or wake up the thread in order to return processing to the alternate. When the alternate stack execution of the I/O request completes, the I/O processing module 140 signals completion and the stack switching module 150 switches processing back to the main stack of the thread (i.e., the requester of the I/O) in the user space 112.

In one embodiment, if the ordinary thread execution at the main stack terminates while an alternate stack exists (e.g., alternate stack had blocked and returned to main stack, where execution completed before returning to alternate stack), then the processing module 140 keeps the thread invisibly active until alternate stack execution completes. In one embodiment, a reference count may be used to keep the main thread alive. For instance, the alternate stack increments the reference count, as well as the main stack of the thread. As long as the reference count is zero, then the thread will be active. If the thread terminates at the main stack before its reference count becomes zero, then the thread will be invisibly active (e.g., terminated, but the reference count keeps it alive).

In further embodiments of the invention, the "final I/O" request(s) may use a state machine approach instead of the alternate stack. Given a typical file system structure, the sequence of I/O requests generally is as follows: (1) read the inode (central record of the file), (2) read the metadata (possibly multiple levels), and (3) read the data. The "final I/O(s)" in such a sequence refers to the leaf of the tree of the file system structure, which is typically the data, and does not necessarily mean the last I/O in the sequence of requests.

The further along in the chain of reading a file system, the more data there is. For example, if we read data from a file, the filename is just a few bytes, the inode is a few hundred bytes, the extent metadata (pointing to where the data blocks may be found on disk) can be several kilobytes (or even hundreds of kilobytes in some cases), while the file data itself can be gigabytes or more. As a result, when reading data from a file, the filename and inode will generally be cached early as there is only one of these types of data (for a given file). In a similar manner, the extent metadata is typically cached early as well. However, the actual file data is likely to not be cached because it is very large.

In some embodiments, instead of the I/O processing module 140 creating an alternate stack for these final I/O requests, the I/O processing module 140 hands over processing of these requests to the state machine module 170. The state machine module 170 then constructs a structure to track the state of the request, and submits the first of a series of I/O requests to the storage device 126. Each time a request completes, the state machine module 170 updates the structure and submits the next request. Eventually processing completes and the state machine module 170 signals, via the I/O processing module 140, the completion to the requesting thread.

In some embodiments, more than one alternate stack may exist at one time for a thread, each alternate stack representing an I/O request submitted by the main thread to the kernel. This may occur if one alternate stack blocks and processing returns to the main stack, where another I/O request is encountered and submitted to the kernel. In this case, the kernel I/O module 104 would create another alternate stack to handle processing of this new I/O request, and so on.

The alternate stack approach of embodiments of the invention is useful to avoid overhead for any I/O requests where the data is expected to be cached (e.g., in memory 124). This is often the case for the initial I/O requests in an execution sequence, as these requests are typically for metadata and inode information that is cached. As such, the actual occurrence of stack switches may be minimal when utilizing the alternate stack approach of embodiments. In addition, the synchronous processing of the I/O request by the kernel I/O module 104 using the alternate stack will not result in any blocking delays. On the other hand, the final I/O(s) in a sequence generally are not cached as these requests are for the actual data found in a storage device. As such, the utilization of the state machine module 170 for these requests can be beneficial.

Figure 2:
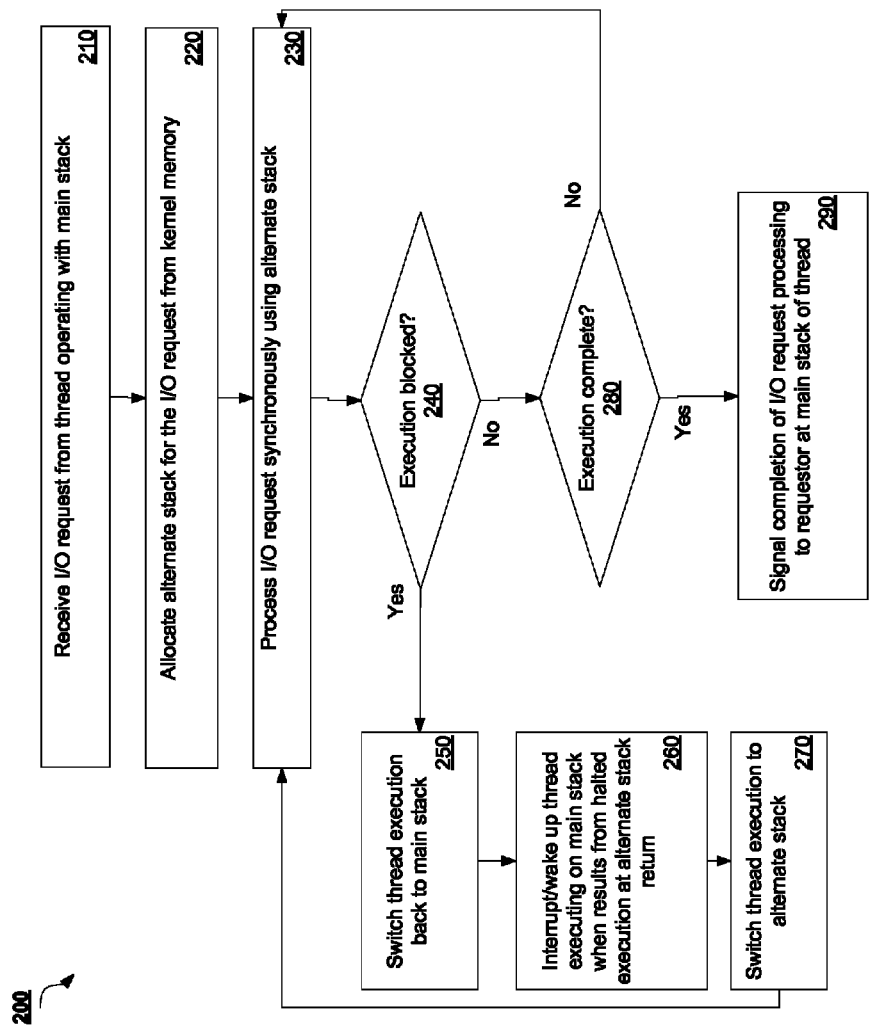
FIG. 2 is a flow diagram illustrating a method for asynchronous I/O using alternate stack switching in kernel space according to an embodiment of the invention.

FIG. 2 is a flow diagram illustrating a method 200 for asynchronous I/O using alternate stack switching in kernel space according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by kernel I/O module 104 of FIG. 1.

Method 200 begins at block 210 where an I/O request is received from a thread operating with a main stack. In one embodiment, the thread is an application execution thread running in user space of an OS of a computing device. When an I/O request is encountered by this thread, it submits the I/O request to the kernel space for processing. At block 220, the kernel I/O module allocates an alternate stack for the I/O request processing. In one embodiment, the alternate stack may be allocated from a prepared pool of stack memory.

Then, at block 230, the I/O request is processed synchronously using the alternate stack. At decision block 240, it is determined whether the execution at the alternate stack has been blocked. If so, the thread execution is switched back to the main stack at block 250. This stack switch occurs instead of blocking the whole thread from executing. In some embodiments, if the thread execution terminates while on the main stack, then the kernel keeps the thread invisibly active until the alternate stack execution completes.

Subsequently, at block 260, the thread executing on the main stack is interrupted (if it is running) or woken up (if it is blocked) when results from the halted execution at the alternate stack have returned. Thread execution is then switched back to the alternate stack at block 270, in order to continue processing the I/O request at block 230.

If the execution at the alternate stack is not blocked at decision block 240, then at decision block 280, it is determined whether the execution at the alternate stack has completed. If not, then method 200 returns to block 230 to continue processing the I/O request synchronously. If execution at the alternate stack has completed at decision block 280, then completion of the I/O request processing by the alternate stack is signaled to the requestor at the main stack of the thread.

Figure 3:
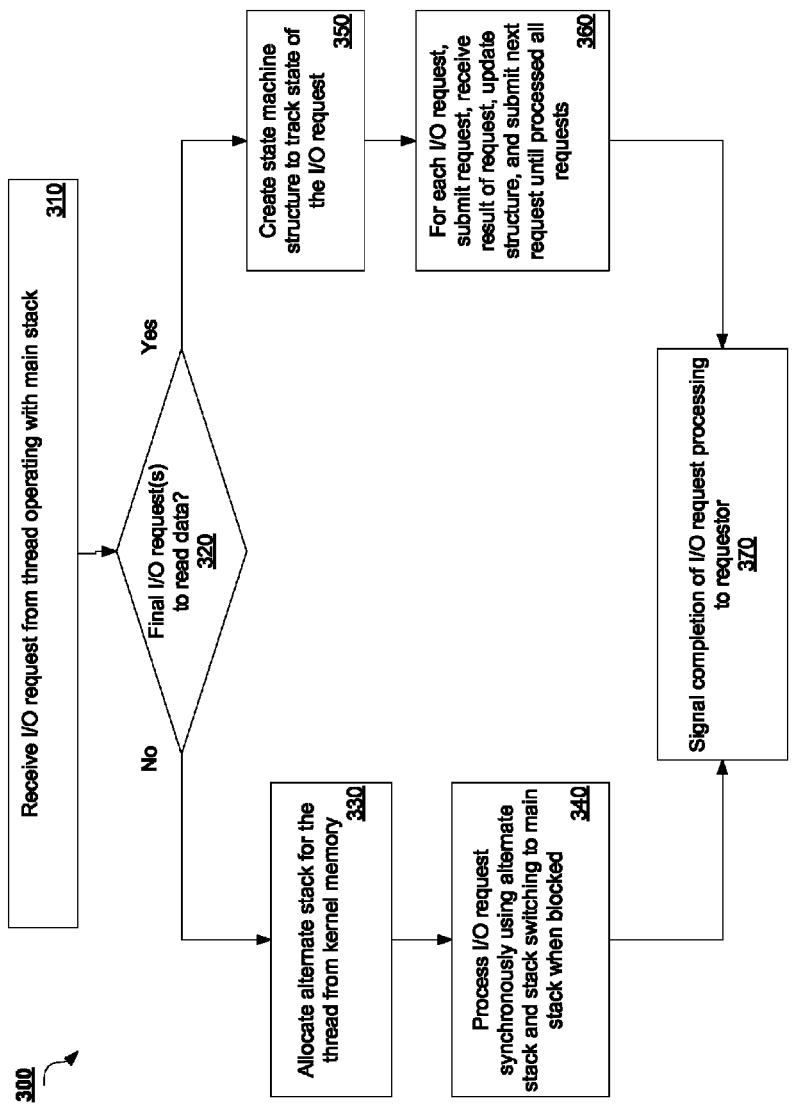
FIG. 3 is a flow diagram illustrating another method for asynchronous I/O using alternate stack switching in kernel space according to an embodiment of the invention.

FIG. 3 is a flow diagram illustrating another method 300 for asynchronous I/O using alternate stack switching in kernel space according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by kernel I/O module 104 of FIG. 1.

Method 300 begins at block 310 where an I/O request is received from a thread operating with a main stack. In one embodiment, the thread is an application execution thread running in user space of an OS of a computing device. When an I/O request is encountered by this thread, it submits the I/O request to the kernel space for processing. At decision block 320, it is determined whether the received I/O request is the final one or more I/O requests for the actual data of the file being read. In one embodiment, the nature of the filesystem structure indicates when a final I/O request is encountered. The final I/O reflects that the request is for data at the leaf of the file system tree structure.

If the I/O request is not a final I/O request, the method 300 continues to block 330, where an alternate stack for the thread is allocated from kernel memory. In one embodiment, the alternate stack may be allocated from a prepared pool of stack memory. Then, at block 340, the I/O request is processed synchronously using the alternate stack and stack switching to the main stack when blocked as described herein. Then, at block 370, completion of the I/O request processing is signaled to the requestor of the I/O request.

On the other hand, if at decision block 320 it is determined that the I/O request is a final I/O, then method 300 continues to block 350 where a state machine structure is created to track the state of the final I/O request. Then, at block 360, each inter-dependent sub-request of the I/O request is processed. This includes submitting the sub-request to a device, receiving the results of the sub-request from the device, updating the structure with the result. This is repeated for each the next inter-dependent sub-request until all sub-requests have been processed for the I/O request. Then, at block 370 the completion of the I/O request is signaled to the requestor of the I/O request.

Figure 4:
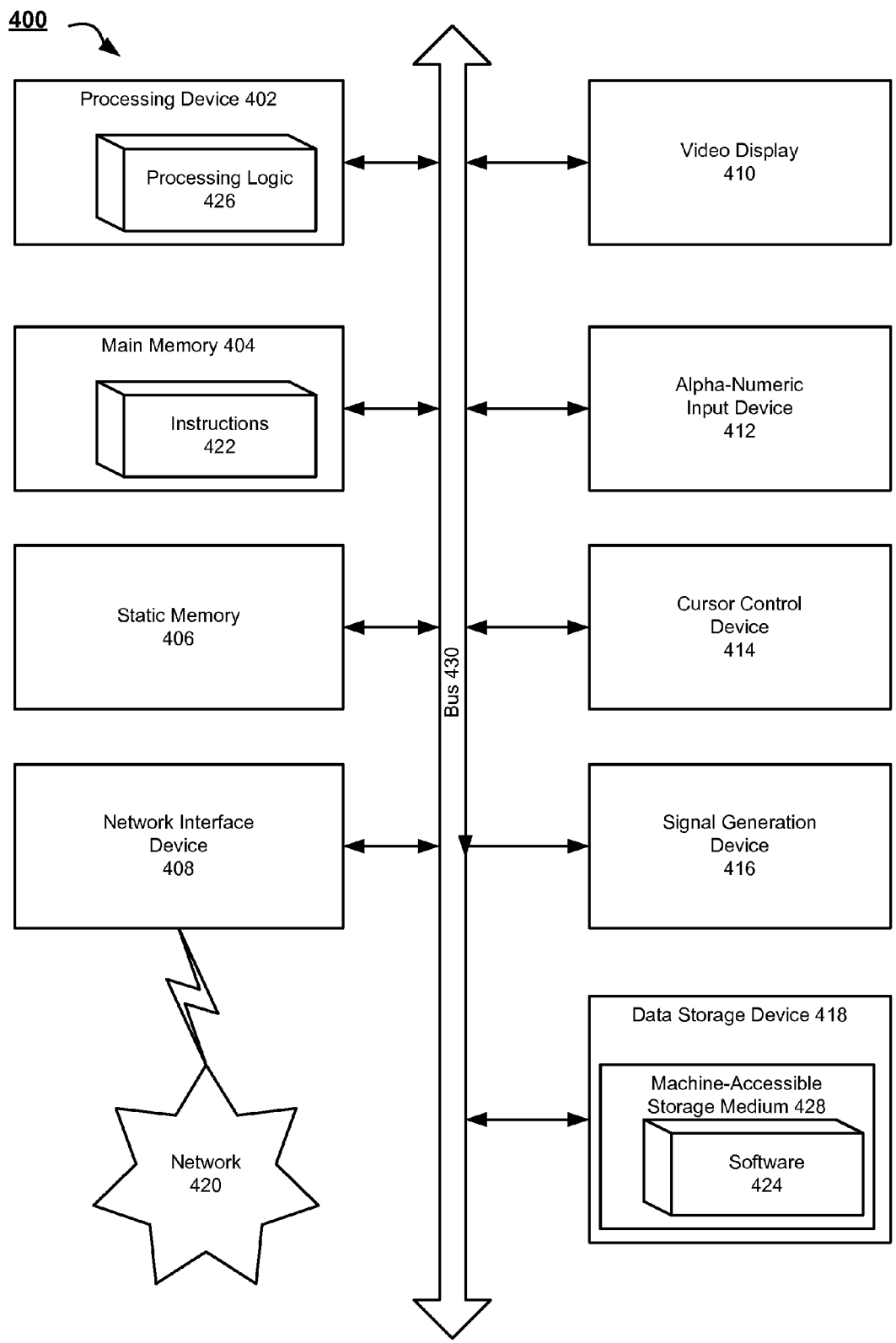
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored software 424 embodying any one or more of the methodologies of functions described herein. For example, software 424 may store instructions to perform asynchronous I/O using alternate stack switching in kernel space by kernel I/O module 104 of a computing device described with respect to FIG. 1. The software 424 may also reside, completely or at least partially, within the main memory 404 and/or within the processing device 402 during execution thereof by the computer system 400; the main memory 404 and the processing device 402 also constituting machine-accessible storage media.

The machine-readable storage medium 428 may also be used to store instructions to perform asynchronous I/O using alternate stack switching in kernel space of methods 200 and 300 described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    receiving, by a kernel executed by a processing device, an input/output (I/O) request from a thread corresponding to an application, the thread executing using a first stack;
    allocating a second stack in kernel space of the processing device, the second stack having higher priority than the first stack;
    switching execution of the thread to the second stack;
    processing the I/O request synchronously using the second stack; and
    switching execution of the thread to the first stack when execution of the thread is blocked while processing the I/O request using the second stack.

2. The method of claim 1, further comprising, subsequent to the switching the execution of the thread to the first stack:
    receiving results from the blocked execution at the second stack;
    at least one of interrupting or waking up the execution of the thread at the first stack; and
    switching execution of the thread back to the second stack to continue processing the I/O request synchronously.

3. The method of claim 2, further comprising when execution of the thread at the first stack terminates prior to the switching execution of the thread back to the second stack, keeping the thread invisibly active in the kernel.

4. The method of claim 3, wherein the thread is kept invisibly active by preventing a reference count for the thread from dropping to zero.

5. The method of claim 2, wherein the second stack is given priority over the first stack by a scheduler of the kernel.

6. The method of claim 1, further comprising:
    receiving one or more final I/O requests of the thread at the kernel;
    creating a state machine structure in the kernel space;
    processing the one or more final I/O requests using the state machine structure to track states of the one or more final I/O requests; and
    signaling completion of the one or more final I/O requests to the first stack of the thread.

7. The method of claim 1, wherein more than one second stack exists in the kernel at one time.

8. The method of claim 1, further comprising signaling completion of the processing of the I/O request to the first stack of the thread when the processing at the second stack completes.

9. A system, comprising:
    a memory;
    a processing device communicably coupled to the memory; and
    a kernel executable from the memory by the processing device, the kernel to:
        receive an input/output (I/O) request from a thread corresponding to an application, the thread executing using a first stack;
        allocate a second stack in kernel space of the processing device, the second stack having higher priority than the first stack;
        switch execution of the thread to the second stack;
        process the I/O request synchronously using the second stack; and
        switch execution of the thread to the first stack when execution of the thread is blocked while processing the I/O request using the second stack.

10. The system of claim 9, wherein the kernel further to, when execution of the thread is blocked while processing the I/O request using the second stack:
    receive results from the blocked execution at the second stack;
    at least one of interrupt or wake up the execution of the thread at the first stack; and
    switch execution of the thread back to the second stack to continue processing the I/O request synchronously.

11. The system of claim 10, wherein the kernel further to, when execution of the thread at the first stack terminates prior to the switching execution of the thread back to the second stack, keep the thread invisibly active in the kernel.

12. The system of claim 11, wherein the thread is kept invisibly active by preventing a reference count for the thread from dropping to zero.

13. The system of claim 9, wherein the kernel further to:
    receive one or more final I/O requests of the thread at the kernel;
    create a state machine structure in the kernel space;
    process the one or more final I/O requests using the state machine structure to track states of the one or more final I/O requests; and
    signal completion of the one or more final I/O requests to the first stack of the thread.

14. The system of claim 9, wherein more than one second stack exists in the kernel at one time.

15. The system of claim 9, wherein the kernel further configured to signal completion of the processing of the I/O request to the first stack of the thread when the processing at the second stack completes.

16. A non-transitory machine-readable storage medium including instructions that, when accessed by a processing device, cause the processing device to perform operations comprising:
    receiving, by a kernel executed by the processing device, an input/output (I/O) request from a thread corresponding to an application, the thread executing using a first stack;
    allocating a second stack in kernel space of the processing device, the second stack having higher priority than the first stack;
    switching execution of the thread to the second stack;
    processing the I/O request synchronously using the second stack; and
    switching execution of the thread to the first stack when execution of the thread is blocked while processing the I/O request using the second stack.

17. The non-transitory machine-readable storage medium of claim 16, wherein the operations further comprise, when execution of the thread is blocked while processing the I/O request using the second stack:
    receiving results from the blocked execution at the second stack;
    at least one of interrupting or waking up the execution of the thread at the first stack; and
    switching execution of the thread back to the second stack to continue processing the I/O request synchronously.

18. The non-transitory machine-readable storage medium of claim 17, wherein the operations further comprise, when execution of the thread at the first stack terminates prior to the switching execution of the thread back to the second stack, keeping the thread invisibly active in the kernel.

19. The non-transitory machine-readable storage medium of claim 16, wherein the operations further comprise:
    receiving one or more final I/O requests of the thread at the kernel;
    creating a state machine structure in the kernel space;

processing the one or more final I/O requests using the state machine structure to track states of the one or more final I/O requests; and signaling completion of the one or more final I/O requests to the first stack of the thread.

20. The non-transitory machine-readable storage medium of claim 16, wherein the operations further comprise signaling completion of the processing of the I/O request to the first stack of the thread when the processing at the second stack completes.

* * * * *